United States Patent Office 3,098,797
Patented July 23, 1963

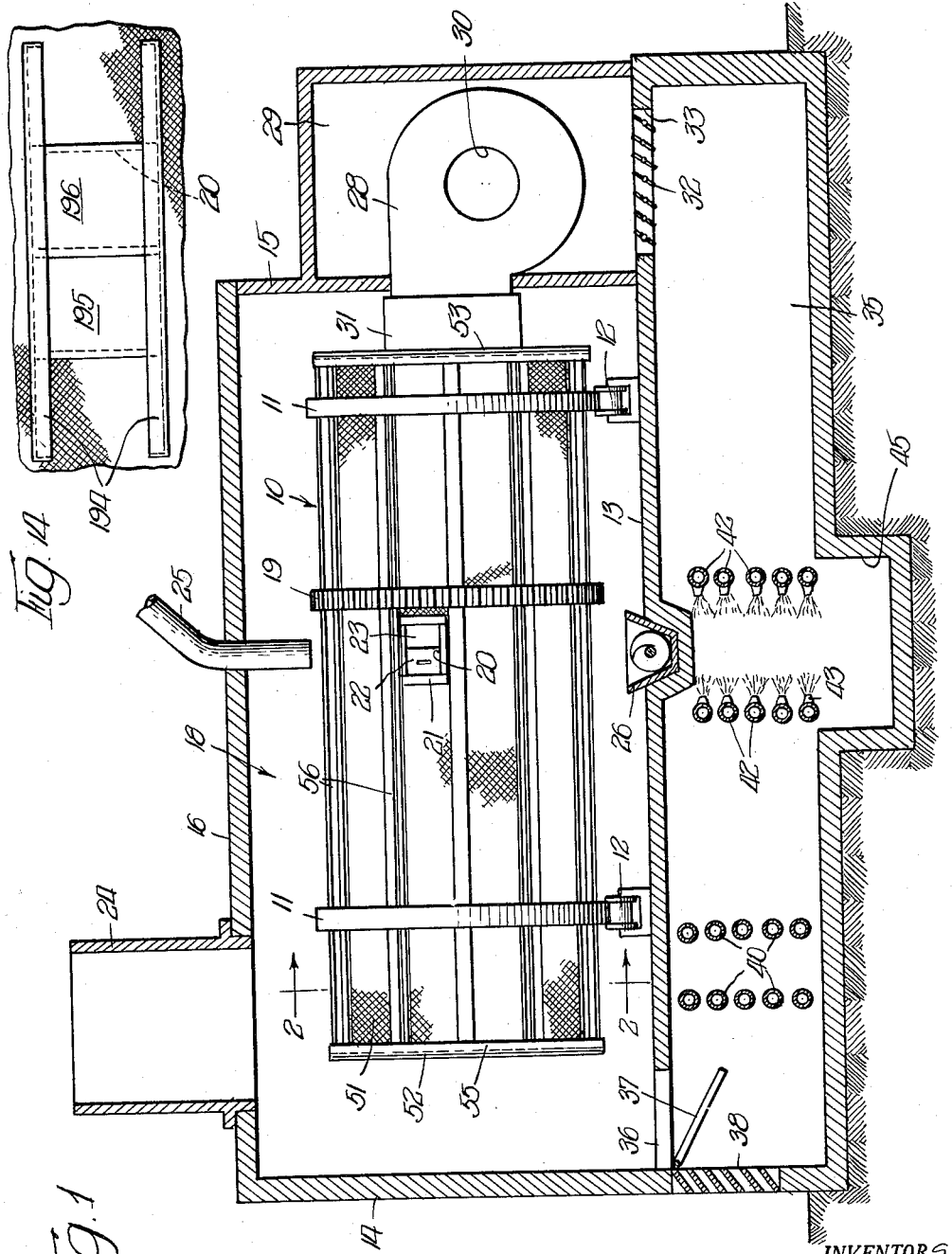

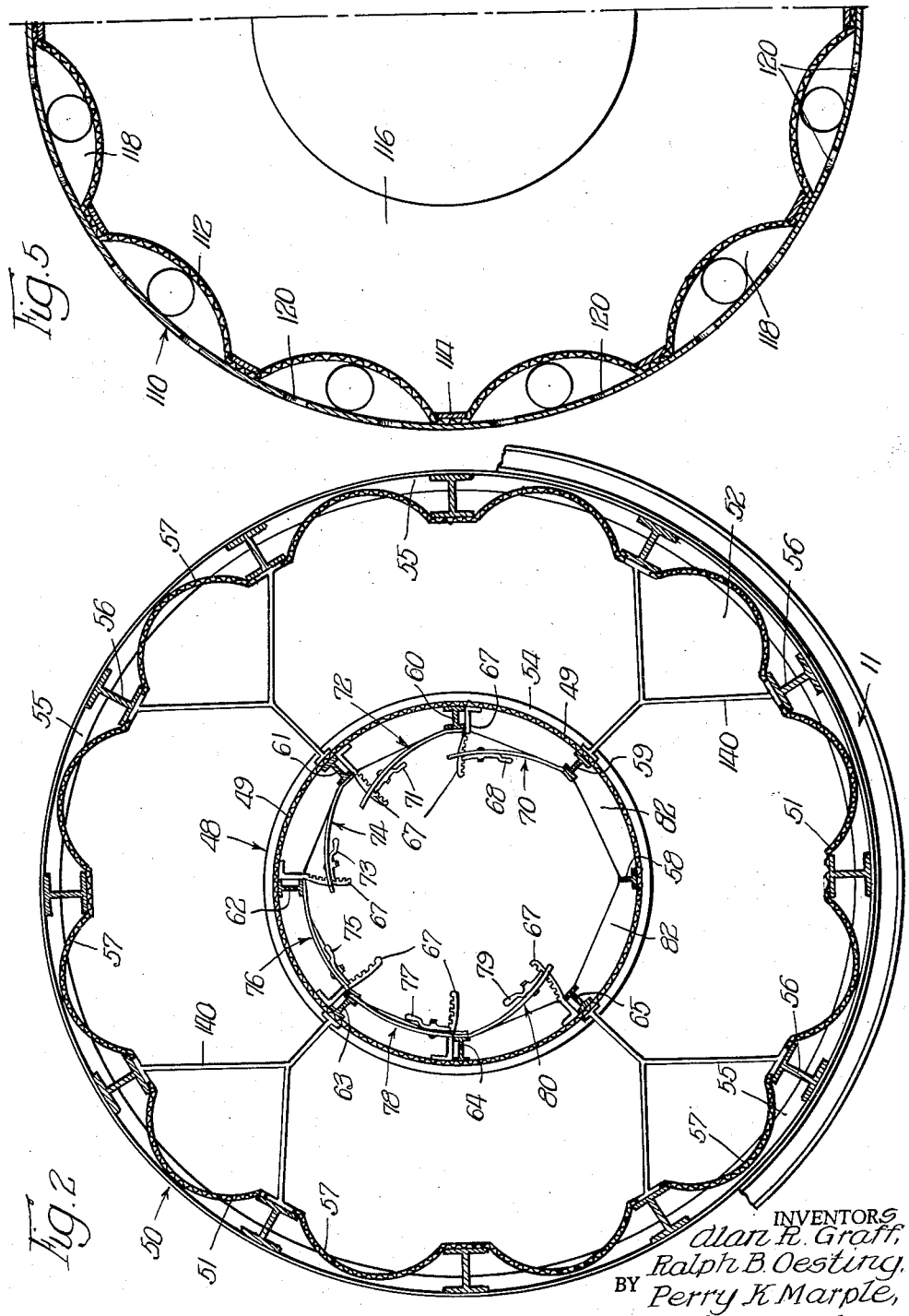

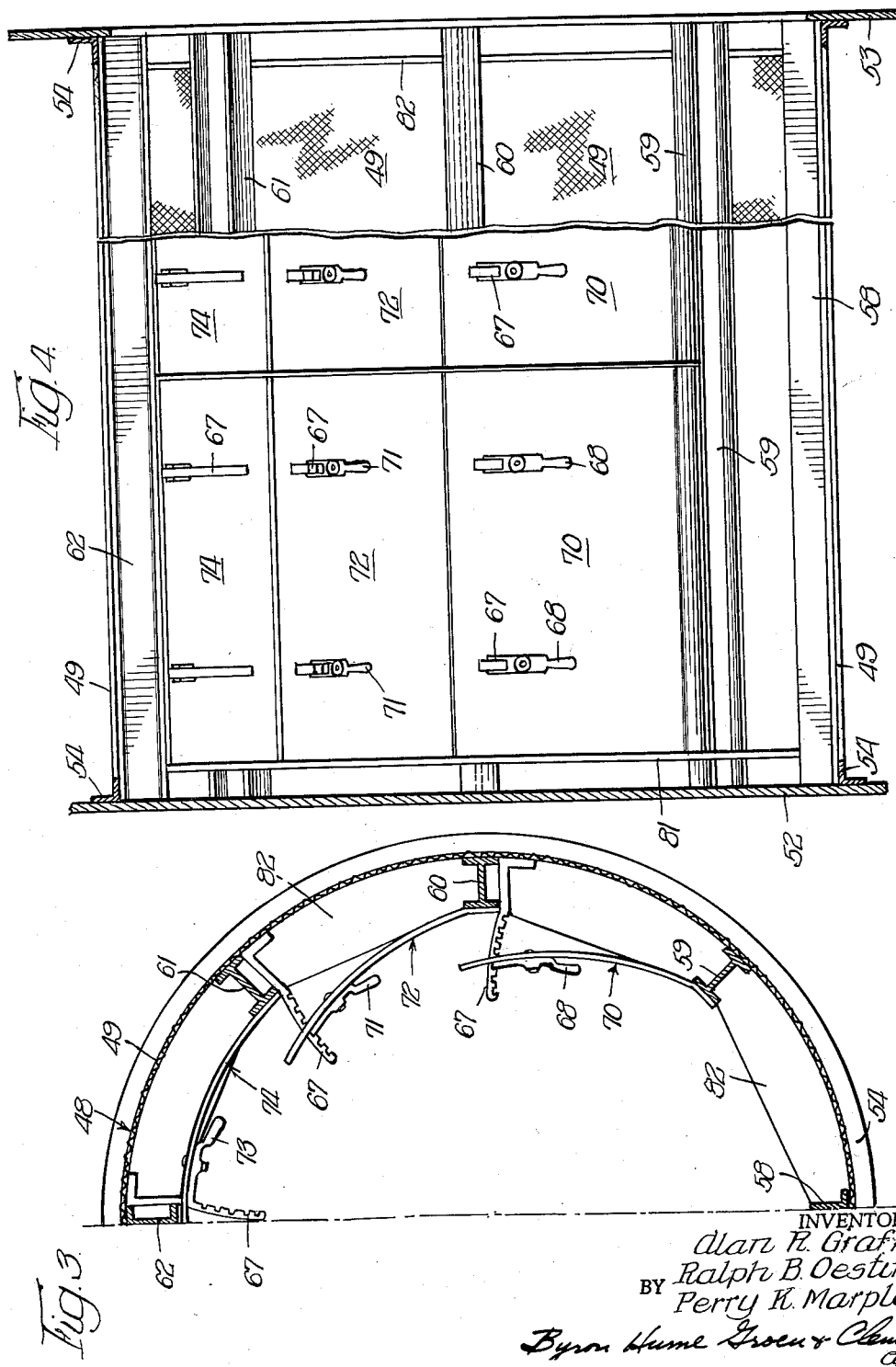

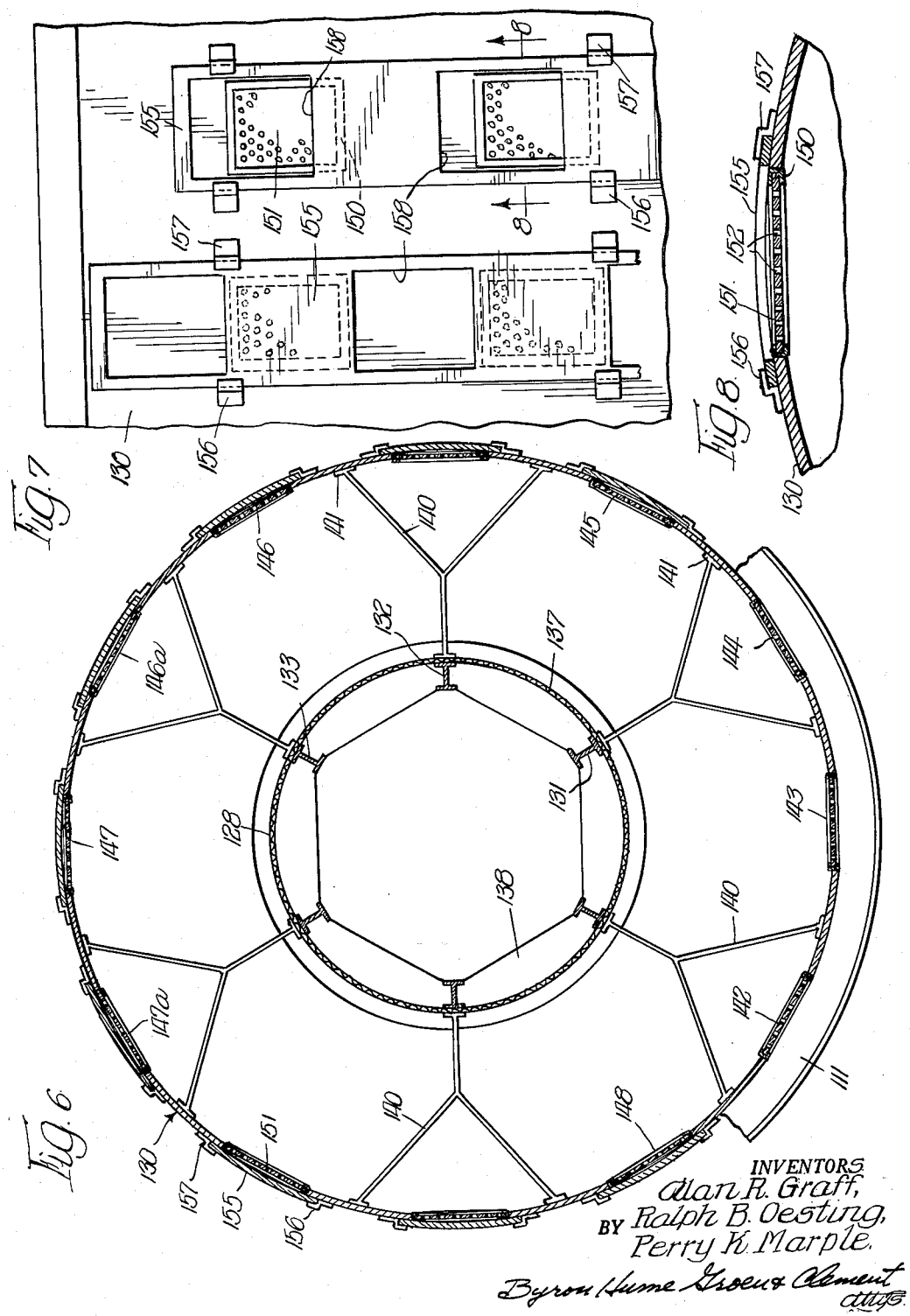

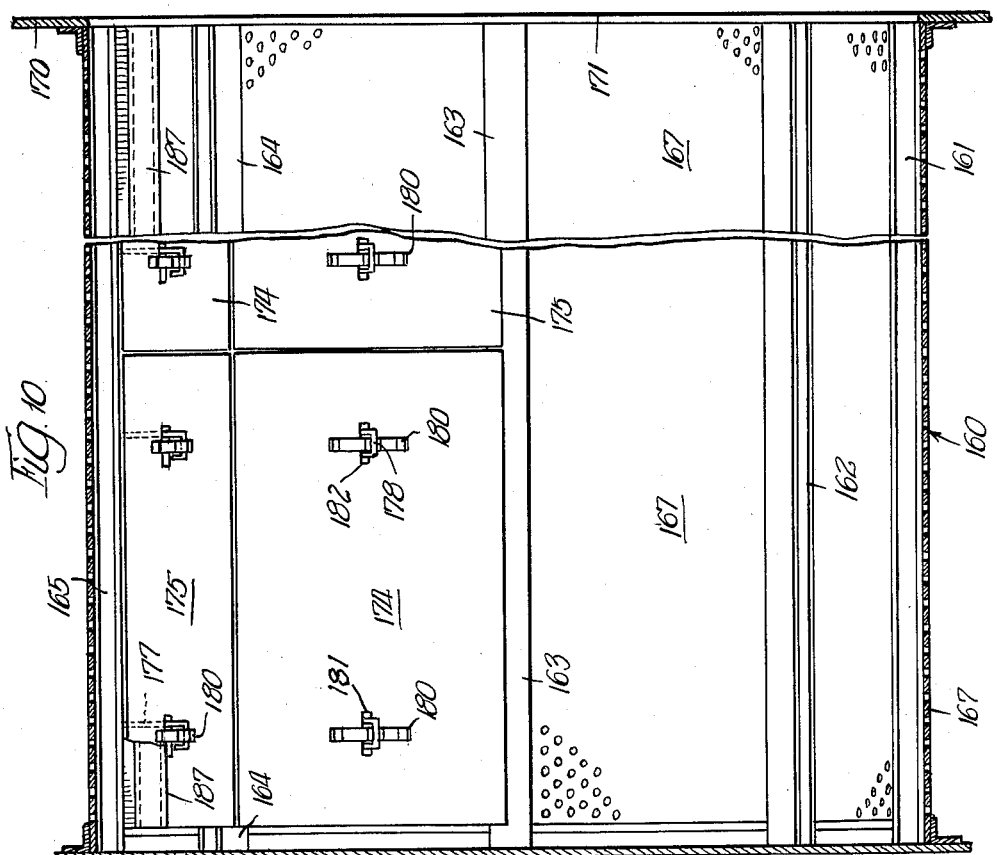
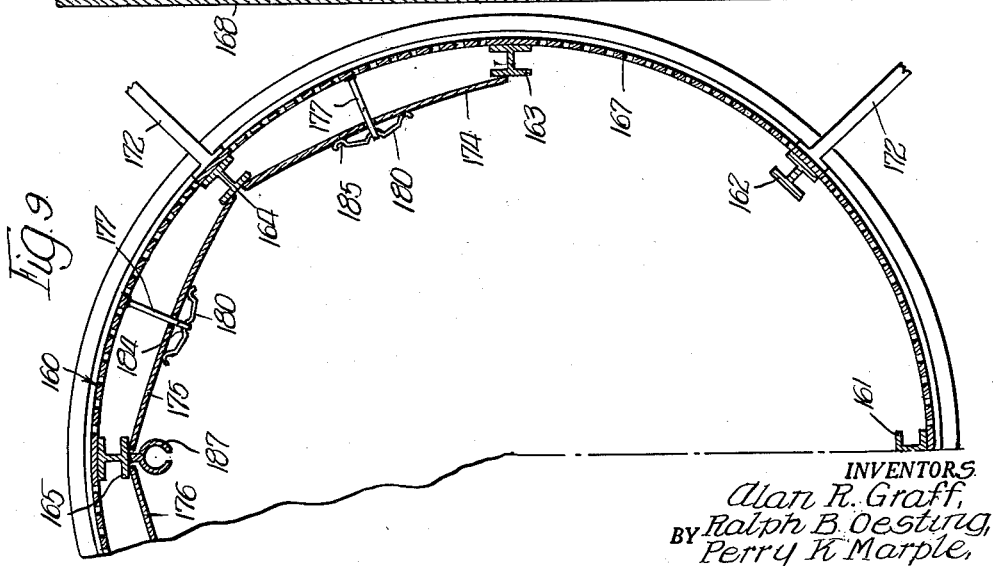

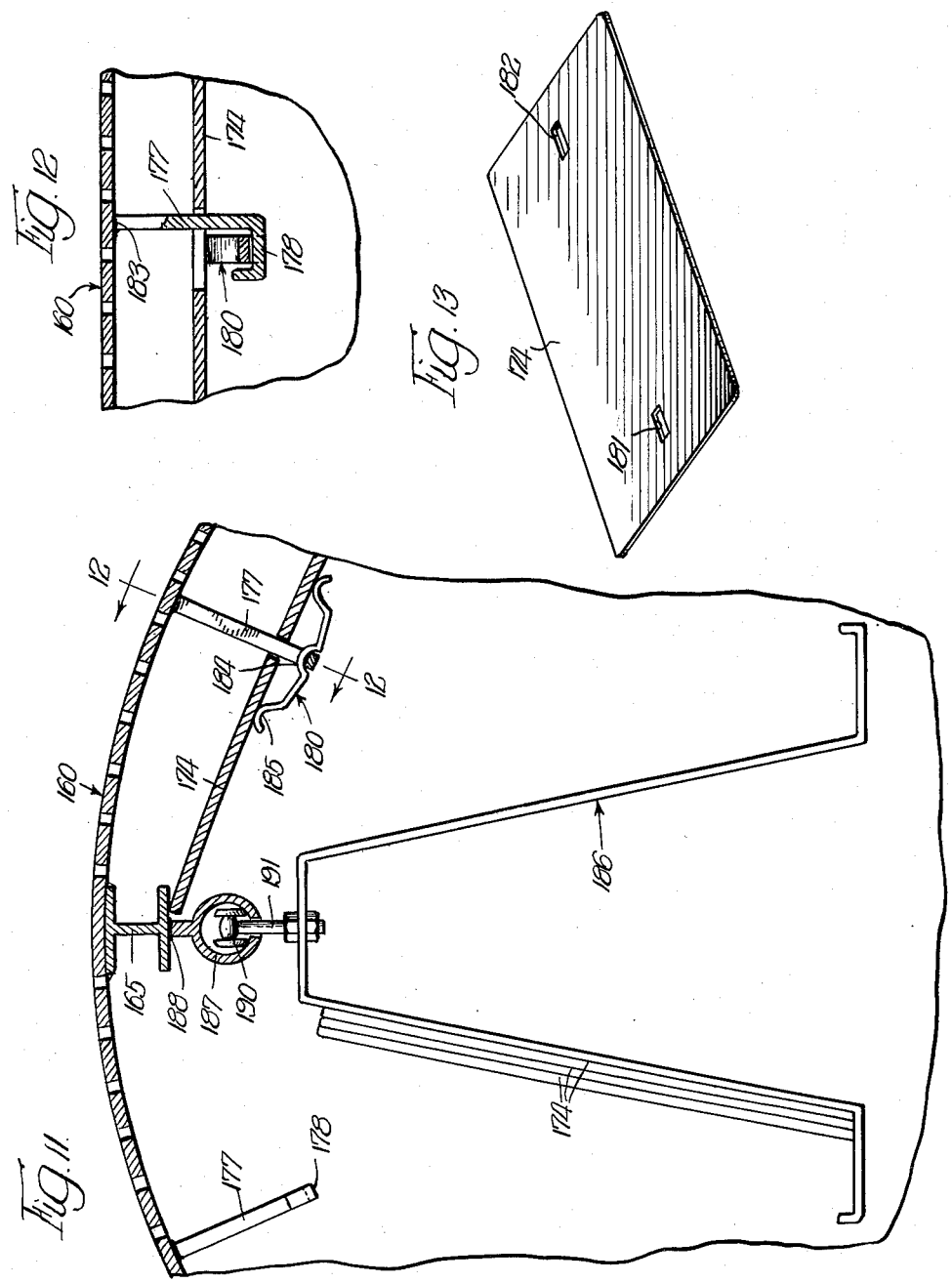

3,098,797
ROTARY MALTING DRUM WITH
ADJUSTABLE LOUVERS
Alan R. Graff, Flossmoor, Ill., Ralph B. Oesting, Valparaiso, Ind., and Perry K. Marple, Chicago, Ill., assignors to The Columbia Malting Company, Chicago, Ill., a corporation of Illinois
Filed Jan. 19, 1961, Ser. No. 83,747
15 Claims. (Cl. 195—131)

The invention relates to malting apparatus of the horizontal rotary type and has reference more particularly to a new and improved horizontal malting drum having adjustable openings for regulating and controlling the flow of air through the drum.

The malting of grain comprises three steps, the steeping of the grain, the germination of the grain, and the drying of the malted grain. The steeping requires the controlled additions of large quantities of water to the grain, whereas, the germination period requires the maintenance of the grain in moist condition while it is turned or moved to aerate it to prevent matting. Also, the germination step is an exothermic reaction and the passage of moderate amounts of cool, moist air through the grain will prevent overheating while maintaining the necessary moisture in the grain. The drying of the germinated and malted grain requires the passage of large amounts of heated air.

The invention has for its primary object to provide a rotary malting drum essentially consisting of inner and outer concentric cylinders and which are perforated throughout and separated from each other to provide the space for containing the grain to be processed, and wherein the air for processing is delivered directly to the inner member in a manner wherein the pressure drop between the fan discharge and the drum itself will be negligible.

Another object of the invention resides in the provision of a rotating malting drum having novel and improved means for regulating the volume of air flowing through the grain in the drum.

A more particular object resides in the provision of a rotary malting drum such as described which will incorporate louvers on the inside of the inner concentric cylinder for regulating the volume of the air permitted to flow through the grain in the drum and wherein the louvers can also be employed for controlling the approximate path which the air may take in flowing through the grain.

Another object is to provide a rotatable malting drum wherein the louvers located on the inside of the inner concentric cylinder are disposed substantially parallel to the rotating axis of the drum and wherein said louvers extend for approximately the entire circumference thereof, leaving, however, an angular gap which is open at all times, each louver being adjustable independently of its adjacent louver.

A further object of the invention resides in the provision of a horizontal malting drum having a plurality of louvers forming an inside wall for the inner concentric cylinder of the drum and which can be independently locked in a closed position or in adjusted open positions whereby the louver structure will materially reduce the by-passing or short circuiting of the air through the mass of grain within the drum during shrinkage of the same. Accordingly by proper adjustment of the various louvers it is possible to obtain greater increased air flow rates which are vital to proper and efficient drying of the grain mass within the drum.

Another object is to provide a rotary malting drum including an inner screened cylindrical shell in concentric relation with an outer cylindrical shell of metal, the latter having an interior liner of perforated sheet metal and a plurality of openings in the outer cylindrical shell and wherein adjustable closures are employed for selectively closing the openings in the metal shell for the purpose of directing and controlling the flow of air through the mass of grain in the drum.

Another object of the invention is to provide a rotary malting drum of the character as described, wherein the outer cylindrical metal shell has a plurality of openings therein fitted with perforated sheet metal for the passage of air while retaining the grain, and wherein the openings are provided with adjustable closure plates for controlling flow of air.

A further object of the invention resides in the provision of an improved arrangement of closure plates for regulating the volume of air flowing through the grain in a rotary malting drum, and wherein said closure plates are releasably fixed to the inside of the inner cylindrical member being retained in place by spring clips which permit the convenient installation and removal of the plates.

In the drawings which illustrate an embodiment of the invention, and wherein like reference characters are used to designate like parts—

FIGURE 1 is a diagrammatic elevational view, partly in section, showing the general layout of the apparatus including the rotary malting drum of the invention, the fan chamber, and related chambers for conditioning and controlling circulation of the air;

FIGURE 2 is a transverse sectional view taken substantially along line 2—2 of FIGURE 1 and showing on an enlarged scale the improved features of the present rotary malting drum;

FIGURE 3 is a fragmentary view also taken in transverse section and illustrating in detail the construction of the louvers for the inner concentric cylinder and the means for locking the same in adjusted position;

FIGURE 4 is an elevational view of the louver construction shown in FIGURE 3;

FIGURE 5 is a transverse sectional view showing a modification of the invention wherein semi-cylindrical screens are employed in connection with a perforated outer shell for the rotary malting drum;

FIGURE 6 is a transverse sectional view showing a modification of the invention wherein adjustable closure plates are employed on the metal shell of the drum;

FIGURE 7 is a fragmentary plan view of the metal shell of FIGURE 6 illustrating the manner of attaching the closure plates;

FIGURE 8 is a sectional view in detail showing a closure plate in associated relation with an opening fitted with perforated sheet metal in accordance with the modification of FIGURE 6;

FIGURE 9 is a fragmentary transverse sectional view illustrating an arrangement of closure plates comprising a modification of the invention;

FIGURE 10 is an elevational view, parts being shown in section, of an arrangement of closure plates such as shown in FIGURE 9;

FIGURE 11 is a fragmentary sectional view illustrating on an enlarged scale the releasable retaining structure and carrier for the closure plates of FIGURES 9 and 10;

FIGURE 12 is a detailed sectional view illustrating the manner of releasably fastening the closure plates in place;

FIGURE 13 is a perspective view of a closure plate such as employed in the arrangement of FIGURES 9 and 10; and FIGURE 14 is an elevational view showing a modified form of door for admitting grain to the drum.

In FIGURE 1 of the drawings the rotatable drum 10 is shown as supported for rotation by the circular rails 11 directly secured to the drum and which rest on rollers 12. The said rollers 12 are in turn supported by the floor 13 which, together with the side walls 14 and 15 and the ceiling wall 16, form a closed chamber 18 for enclosing the perforated malting drum 10. The drum is provided with an encircling gear 19 which may be driven to rotate the drum by any suitable means. Also, one or more filling and discharge openings such as 20 are formed by the transverse beams 21, the said openings being normally closed by the cover plates 22, which are slidable over the stationary plates 23 for opening purposes. A stack 24 carries exhaust air from the chamber 18. The grain to be processed is admitted to chamber 18 through an adjustable chute 25 leading directly to the filling and discharge opening 20. Accordingly for filling the drum the cover plate 22 is moved to expose the opening 20 located directly under the chute 25. A conveyor trough 26, equipped with a spiral conveyor, is located in the floor below the openings 20 and likewise by movement of a cover plate the processed grain can be discharged through opening 20 directly into the conveyor. A blower 28 driven of suitable power, is located within the blower chamber 29. The blower 28 has an inlet 30 and its discharge side has a short length 31 of relatively large diameter pipe connecting the blower directly with the inner cylinder of the malting drum. The louvers 32 located in the inlet 33 to the blower chamber 29 are adjustable for controlling the flow of air to the chamber.

The horizontal air flue 35 is located below the floor 13 and for supplying air to said flue the floor is provided with an opening 36 located at the left hand end of the flue and which is controlled by the damper 37. Air is also supplied to the flue by the louvered opening 38. The damper 37 may be so positioned as to close opening 36, in which event no air is recirculated from chamber 18 through the flue 35. In the partially opened position, as shown in FIGURE 1, a portion of the air from chamber 18 will be recirculated and some fresh air will be drawn in through the louvers 38 to be mixed therewith.

For conditioning the air circulated by the flue 35 a plurality of burners 40 are located within the flue adjacent the left end thereof. Said burners may be supplied with gaseous fuel for heating the air passing over the burners during the drying state of the malting operation. A plurality of water pipes 42 are also located in the flue 35, said pipes being provided with a plurality of nozzles 43 to produce sprays of water through which the air is caused to flow. It will be understood that the water sprays will not be used concurrently with the burners, but only during that portion of the malting operation which requires a cooling draft of moist air. A sump 45 is located below the water pipes 42 to carry off excess water. From the water sprays the air flows to the right hand end of the flue chamber which is in communication with the blower chamber. Accordingly, air is drawn in through the inlet 33 and supplied to the suction side of the blower 28 for eventual delivery in a straight line by the blower at a relatively high pressure directly to the central screened cylinder of the malting drum 10.

As best shown in FIGURE 2, the horizontal malting drum 10 essentially consists of an inner cylindrical member 48 and an outer cylindrical member 50, both of which have porous shells or, more particularly, the cylindrical walls of the members may consist of screening 49 and 51, respectively. In all cases the openings in the screening will be of such size as to permit the passage of air and prevent the passage of grain to be malted. The inner and outer cylindrical members 48 and 50, respectively, are retained in concentric spaced relation by means of solid end plates 52 and 53, see FIGURE 4, to which the L-shaped structural members 54 and 55 are respectively secured. The supporting framework for the outer member 50 of the drum essentially consists of a plurality of longitudinal beams 56 which are spaced substantially equidistant around the periphery of said member, being secured as by welding to the L-shaped member 55 and to the end plates 52 and 53. The screening 51 for the outer cylindrical member 50 of the drum is characterized by the outwardly projecting semi-circular portions 57 which are uniformly disposed between the beams 56.

The inner cylindrical member 48 extends from end plate 52 to end plate 53 and whereas one end thereof is closed by plate 52, the other end of the inner cylindrical member is open for receiving the conduit 31 which thereby connects the member with the high pressure discharge end of the blower. The framework for the central screened cylinder 48 essentially consists of a plurality of metal beams such as 58 to 65 inclusive, FIGURES 2 and 3, and which are preferably spaced equi-distance around the inside circumference of screening 49. The beams 58 to 65, inclusive, are secured as by welding to the L-shaped members 54 to the end plates 52 and 53. With the exception of beams 58 and 59 the remaining beams provide a support to which the notched bars 67 are secured. The beams 65 and 59 are angularly spaced to form an open gap as regards the cylindrical member 48, except, of course, for the screening 49. However, in accordance with the invention, the remaining circumference of the central cylinder is provided with a plurality of louvers which may be locked in a closed position or in adjusted open positions to in turn control the flow of air from the said cylinder through the grain in the drum.

A series of louvers 70 extend longitudinally and they close the openings between the beams 59 and 60. Each of said louvers 70 consists of a sheet of relatively thin metal, the same being welded along one longitudinal edge of the beam 59 and having an opening at their opposite edge through which the notched bar 67 extends. By means of the handle 68 on each louver 70 the same can be locked in either closed or open positions by coaction with said notched bar. Although the louvers are shown as welded to a supporting beam, it will be understood that a pivoted connection could be employed. In a similar manner a plurality of axially aligned louvers 72 are provided for closing the opening between beams 60 and 61, with the louvers being welded to beam 60 and having coaction at their opposite end with the notched bar 67 by means of the handle 71. Additional louvers 74 are secured to beam 61 for closing the opening between beams 61 and 62. A handle 73 on each louver has locking engagement with a notched bar 67 for maintaining the louver closed or in adjusted open positions. The remaining half section of the inner circumference of cylinder 48 is equipped with louvers namely 80, 78 and 76 which are similar in all respects to those described. End plates such as 81 and 82 are located at intervals throughout the length of the inner cylinder between the various beams and they connect therewith to define the limits of the opening controlled by their particular set of louvers.

In the operation of the rotary malting drum as disclosed, it will be understood that the horizontal air flue 35 is employed for conditioning the air, with the louvers 32 being employed for controlling the quantity of air flowing through the grain in the drum and also louvers 70, 72, 74, 76, 78 and 80 for controlling the approximate path of flow. It may be understood that the apparatus and drum may be used for steeping, for germinating, and for drying or kilning the grain, or for any combination of these. For example, it may be desired to provide conical bottom steep tanks or similar facilities as an auxiliary to the drum so that the steeping may not be carried on in the drum itself, thereby increasing the weekly out-put or monthly out-put of the apparatus. On the other hand, the simplicity of having no other apparatus and charging dry, raw barley or other grain into it at the beginning of the cycle, steeping it, germinating it, kilning it and taking the finished product off from the same drum at the end of the cycle, will have obvious advantages in the simplicity, compactness, etc., and in the overall efficiency of the installation.

In the event the apparatus is used for steeping, germinating and drying, starting with raw barley and ending with finished malt, the cycle will start with all of the louvers open and the blower 28 operating at low speed and probably with the inlet louvers 32 throttled. Water is introduced through a suitable sparging pipe into the inside of cylinder 48 as best shown in the patent to Graff et al., No. 2,947,669, granted August 2, 1960, and entitled Rotary Malting Equipment. During the sparging or steeping process it is preferred to have a moderate current of air also passing through the grain to promote aeration of the grain at the same time that it is being steeped, and also to control the temperature of the grain by means of conditioning the air; this is often convenient when the sparging water is at a temperature somewhat lower or somewhat higher than that desired. After a suitable period of sparging or steeping in this manner, the grain will have imbibed the proper portion of water (which may be between 35 and 45 percent) and the steeping process is terminated. The germinating process will have already commenced during this steeping process with the introduction of air and the same accordingly continues. During the steeping process the drum is rotated to facilitate uniform steeping. In the germinating process the rotation of the drum is continued, and it may be desired to increase the flow of air through the malt bed, but this air flow is moderate with the blower operating at low speed. At the end of the germinating process the drum is almost completely filled, although at the start of the steeping operation the drum was a little more than half full. At the end of the germinating process the attemperator sprays in the horizontal air flue 35 are shut off.

For commencing the kilning or drying process, rotation of the drum is stopped and the drum is indexed around to a position wherein the gap opening between the beams 65 and 59 is located adjacent to the bottom of its arcuate path and approximately 180 degrees opposite the thinnest portion of the malt bed of the drum. According to the judgment of the maltster some of the louvers 70 to 80 may now be closed. At the start of the drying period large quantities of heated air will be delivered directly to the central screened cylinder 48 with minimum turbulence and at a relatively high pressure.

The following is an example of one kilning schedule. At the start, the topmost louvers 74 and 76 may be completely closed to restrict any channelling of the air through the thinnest portion of the malt bed. The louvers adjacent thereto on both sides, namely 72 and 78, may be partially open to an extent of approximately four inches. The louvers 70 and 80 adjacent the gap opening may be open to about nine inches, so that the major portion of the air is discharged into the bottom of the grain bed for upward flow and for uniform diffusion and distribution through the bed. After the drying operation has progressed for approximately twenty hours, the closed louvers remain closed, and the open louvers may remain open except for 72 and 78, which now may be closed to a greater extent, thus leaving an opening of only one to two inches. After thirty hours of drying, all the louvers may be closed except 70 and 80 which may be open to an extent of approximately two inches. By reason of the locking handles on the various louvers, the open position of each can be adjusted to suit the operator. The dried grain can be removed from the drum by moving one or more of the cover plates 22, whereupon the grain is discharged into conveyor 26.

Spiral lands within the outer cylindrical member leading to the discharge opening 20 permit the emptying of the drum completely merely by rotating the drum. Thus manual labor for this purpose is not required.

In the present apparatus, excessive pressure losses have been eliminated and substantially all of the power expended by the blower is applied in actually forcing the air through the grain. However, the velocity of the air in flowing through the grain mass is not excessive since immediately upon emerging from the center cylinder the air velocity is decreased due to the shape and longitudinal extent of the drum. Since there is no motion of the grain during the drying period, recirculation of the air or a part thereof does not produce a dust hazard nor are the sprouts dislodged.

In the modification of FIGURE 5 the structure of the central perforate member 48 remains as described and changes have been made to the outer cylindrical member only. The said outer member indicated by numeral 110, is a cylindrical metal shell, and provision is made for discharging air from the member by the semi-circular portions 112 of perforated sheet metal which are directed inwardly. The members 114 secure the screen portions 112 at spaced intervals to the inside surface of the metal drum 110 and in connection therewith it will be understood that the end plates 116 may be scalloped around their periphery to form a plurality of semi-circular openings or openings such as 118 may be formed in the end plates. Also it is preferred that the outer cylindrical member 110 be provided with openings such as 120. In this manner flow passages are provided in the shell and at either one or both ends of the drum for the escape of air.

In the modification of the invention as shown in FIGURES 6, 7 and 8 the outer metal shell of the drum is provided with a plurality of screened openings, and closure plates are provided for closing the screened openings in an adjustable manner whereby to control the size of the openings for selectively controlling the quantity of air flowing through the drum and also the approximate path of flow of said air.

The inner cylindrical member 128 is located concentrically within the outer cylindrical shell 130. Member 128 consists of the structural beams 131, 132, 133, etc. and which retain the wire mesh screening or perforated sheet metal designated by the numeral 137. Metal end plates at each end of the drum structure help to retain the inner cylindrical member in spaced concentric relation with the outer cylindrical shell, all as described and explained in connection with FIGURE 2. The beams 131, 132, 133, etc., are connected and joined together to form a unitary arrangement by the transverse plates 138 located at spaced intervals longitudinally of the inner cylindrical member. The metal struts 140 are additionally provided to assist in connecting the inner cylindrical member with the outer cylindrical shell whereby these two elements as thus connected comprise the complete rotary drum. It will be observed that the struts 140 connect the structural beams of the cylindrical member with the metal shell 130 of the outer cylindrical member. The struts are similar to those as described in connection with FIGURE 2, having a foot portion 141 at respective ends and which are, in turn, suitably secured as by welding to the beams and to the inner surface of the metal shell 130 at spaced locations circumferentially of the shell. It will be understood that one or more openings such as 20 FIGURE 1, may be formed in the exterior metal shell 130 in order to provide for filling and for emptying the space within the drum with the grain to be malted. A plurality of circular rails such as 111 are directly secured to the metal shell 130 as shown in FIGURE 6, and the said rails rest on the rollers 12, FIGURE 1, to thus support the drum for rotation.

In the modification of FIGURES 6 to 8, inclusive, the outer metal shell 130 is provided with a plurality of screened openings such as 142, 143, 144, 145, 146, 147 and 148. The said openings are suitably fitted with a frame member 150 FIGURE 8, which mounts within each opening a perforated metal plate 151, the perforations of which are indicated by numeral 152. The screened openings as thus provided are disposed in spaced relation longitudinally and circumferentially of the metal shell 130, and in all cases the perforations 152 are of such size as to permit the passage of air while preventing the passage of the grain being processed.

It is desired to selectively control the flow of air through the drum and in accordance with the invention, movable closure plates 155 are provided for most of the screened openings. However, the screened openings 142, 143 and 144 are not provided with closure plates, and accordingly, this portion of the drum is similar to the gap opening as described and explained in connection with the louvers, FIGURE 2. As shown in FIGURES 7 and 8, the closure plates 155 are disposed longitudinally of the drum on the exterior surface of the shell 130 and brackets such as 156 and 157 are located on respective sides of each plate as retaining means therefor, and which retain the closure plates directly over and in alignment with the screened openings and in a manner whereby the plates can be moved with respect thereto. Each closure plate 155 has formed therein a number of openings 158 of a size approximately equal to the screened openings and which are spaced longitudinally of the plate a distance about equal to the longitudinal spacing between the screened openings. Accordingly, it is possible to locate the openings 158 in desired adjusted position with respect to the screened openings. In one position of the closure plates as shown in FIGURE 7, the screened openings are completely closed, since the imperforate portions between the openings 158 are located respectively over the screened openings such as 145. In another position of the closure plates as shown in FIGURE 7, the openings 158 therein only partially cover the screened openings, and accordingly a controlled amount of air is permitted to escape from the drum by flowing through the open perforations 152 of the plates 151.

In the operation of the rotary malting drum of FIGURES 6, 7 and 8, it will be understood that steeping, germinating and drying the grain can be performed in the said drum with the assistance of the closure plates for controlling the air flow, and with the assistance of the flue 35 for properly conditioning the air for each operation. At the start of a steeping period, the blower 28 will be operated at a low speed and all of the closure plates 145 to 148 will be open. Water is introduced into the grain in the drum as described in connection with FIGURE 2. Accordingly the steeping period and also the germinating period are conducted in substantially the same manner as has been previously set forth.

For the drying period, rotation of the drum is stopped and the same is indexed to a position wherein the gap opening comprising the screened windows 142, 143 and 144 is located at the bottom approximately 180 degrees opposite the thinnest portion of the malt bed. One or more of the closure plates such as 146a, 147 and 147a may now be closed. As the drying period continues more of the closure plates are closed and some are only partially closed. After thirty hours of drying during which time large quantities of heated air are discharged through the malt, all the closure plates will be closed, except possibly 145 and 148 which may be opened to a slight extent, all depending on the judgment of the maltster for obtaining the most satisfactory drying of the product within the drum.

Another arrangement of closure plates for regulating the volume of air flowing through the grain in a rotary malting drum is disclosed in FIGURES 9 to 13, inclusive. In this modification the closure plates are releasably fixed to the inside of the inner cylindrical member and the said plates are thus selectively removable for regulating air flow. As best shown in FIGURES 9 and 10 the inner cylindrical member 160 is formed by the structural beams 161, 162, 163, 164 and 165, etc., and which retain the perforated sheet metal shell 167. The openings in the metal shell are of such size as to permit the passage of air but prevent passage of the grain to be malted. Metal end plates such as 168 and 170 at respective ends of the drum structure help to retain the inner cylindrical member in spaced concentric relation with the outer cylindrical shell. Also, the internal struts 172 assist in this function, since they connect the structural beams 162–164, etc., of the inner member with the structure comprising the outer cylindrical member. The end plate 168 is imperforate and plate 170 is also imperforate except for the opening 171 therein and which is approximately the same size in diameter as the sheet metal shell 167. The opening 171 receives the conduit 131 which thus connects the inner member with the high pressure discharge end of the blower.

The perspective view, FIGURE 13, shows a closure plate of the type employed for this modification of the invention. The beams 163 and 164 support plates such as 174. In a similar manner the beams 164 and 165 support closure plates 175. Likewise, the beams 165 and the beams 166, not shown, support closure plates 176. The said plates extend longitudinally of the inner cylindrical member on the inside thereof and each plate has a length so that a plurality of plates are required to fill the space between the beams from one end of the member to the other. Also, the plates are disposed for approximately one-half of the circumference of the member 160, which accordingly leaves gap openings between beams 161, 162 and 163. Similar gap openings are left on the opposite side of the member.

In accordance with the invention the individual closure plates are each releasably locked in supporting relation on their respective beams by the hook members 177, FIGURE 12, each hook member having a hooked extremity such as 178 for receiving and retaining a spring clip 180. As best shown in FIGURE 13 each closure plate is formed with a pair of spaced openings 181 and 182. The openings are of a size to receive the hooked ends 178 of its respective pair of members 177. Each member 177 is suitably welded or otherwise fixedly secured to the inside surface of the metal shell 167 as at 183. The members have a length so that with the plates in supported relation on their respective beams, the hooked extremity 178 will project beyond the plate thus giving the operator convenient access thereto. It is relatively easy to insert the spring clip 180 between the plate and the hooked extremity 178 and it will be observed that the spring clip is formed with a central concavity 184 for receiving and retaining engagement with the hooked extremity. The laterally disposed ends of a spring clip 180 are curved as at 185 and when the spring clip is in retained position the said curved ends 185 function to apply resilient pressure to its plate, maintaining the plate in supported position.

It is relatively easy to remove the closure plates and since each plate is individually retained in position, the plates can be selectively removed for the desired regulation of air flow through the drum. It is only necessary to depress the spring clips 180 whereupon the same can be withdrawn from engagement with its hooked extremity. When both spring clips of a closure plate have thus been removed, the plate is free of its retaining means, and in order to facilitate handling and transportation of the plates longitudinally of the drum, the invention provides a carrier indicated in its entirety by numeral 186, FIGURE 11. As the plates are removed they can be conveniently placed on the carrier 186 which is bodily movable for the length of the drum. Before a malting operation the entire carrier and the plates are removed from the drum through the opening 171. Likewise when it is desired to add a number of plates to the drum, the carrier is employed and thus plates are disposed in a convenient manner for the operator.

As previously explained the rotation of the drum is stopped for the drying period, and the same is indexed to a position wherein the gap openings are located at the bottom approximately 180 degrees opposite the thinnest portion of the malting bed. This position of the drum will locate the structural beam 165 at the top of the inner cylindrical member. This member is accordingly selected as the support for the channel member 187 which is suitably welded to the beam as at 188. The channel member 187 extends longitudinally of the drum from one end plate to the opposite end plate, and the track mechanism 190 is conveniently received thereby with the support 191 depending from the carrier and which thereby positions the carrier 186 in depending relation within the inner member. The carrier is, of course, removed before the drum is again rotated and the same is employed merely to facilitate the removal and the application of the plates in a selective manner within the inner member, all for the purpose of obtaining the desired circulation of air through the grain as it is subjected to the various malting operations.

A modified form of cover plate for the filling and discharge opening 20 is shown in FIGURE 14. The spaced rails 194 provide guideways for the movable doors 195 and 196. When closed the doors overlap and both doors are movable in order to provide full access to the opening 20.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a rotary malting drum, the combination with an outer cylindrical member, of an inner cylindrical member disposed concentric with respect thereto, the cylindrical walls of the inner member being perforated to permit the escape of air from within the member, a plurality of louvers located within the inner member in associated relation with the circumference thereof, and means having connected relation with the louvers for locking the louvers in either closed or in adjusted open position.

2. In a rotary malting drum, the combination with an outer cylindrical member, of an inner cylindrical member disposed concentric with respect thereto, the cylindrical walls of the inner member being perforate to permit the escape of air from within the member, a plurality of louvers located within the inner member and disposed around the circumference thereof, means pivotally securing one end of the louvers respectively for movement toward and from the circumference of the inner member for closing and opening movement of the louvers, notched bars fixed to the cylindrical walls of the inner member and projecting inwardly approximately radially of the member and operatively associated with the louvers respectively, and a locking handle carried by each louver for coaction with its notched bar for locking the louvers in either closed or in adjusted open position.

3. In a rotary malting drum, in combination, an outer cylindrical member and an inner cylindrical member, both members having perforate cylindrical walls and solid end walls, structural members in the form of beams located around the circumference of the inner member and angularly spaced to form openings extending longitudinally of the beams, louvers associated with certain of said longitudinally extending openings for controlling the closing and opening of the same, and means having connected relation with the louvers for locking the louvers in either a closed or in an open position.

4. In a rotary malting drum, in combination, an outer cylindrical member and an inner cylindrical member in substantially concentric relation with each other, both members having perforate cylindrical walls and solid end walls, whereby air admitted to the inner member will flow approximately radially from the inner member to escape from the outer member, structural members in the form of beams located around the circumference of the inner member and angularly spaced to form openings extending longitudinally of the beams, louvers associated with certain of said longitudinally extending openings for controlling the closing and opening of the same, means pivotally securing one end of each of the louvers to a beam for pivotal movement to provide for the closing and opening of the louvers, notched bars fixed to certain beams and extending inwardly and operatively associated with a particular louver, and a locking handle carried by each louver for coaction with its notched bar for locking the louvers in either closed or in adjusted open position.

5. In a rotary malting drum, in combination, an outer cylindrical member and an inner cylindrical member in substantially concentric relation with each other, said outer cylindrical member including solid end walls, a plurality of structural beams connecting the end walls and disposed in angular spaced relation around the circumference of the outer member, screening supported by the said structural beams and providing the cylindrical wall of the outer member, additional beams connecting the end walls and disposed in angular spaced relation around the circumference of the inner member, screening supported by the second mentioned beams and providing the cylindrical wall of the inner member, louvers associated with certain pairs of the second mentioned beams for controlling the closing of the longitudinal opening between the beams, means pivotally securing each of the louvers to one of the second mentioned beams in a manner to permit opening movement inwardly of the inner member, and other means having connected relation with the louvers for locking the same in either closed or in adjusted open position.

6. In a rotary malting drum, in combination, an outer cylindrical member providing a metal shell for the drum, said metal shell having a plurality of screened openings therein to permit the escape of air but which prevent the passage of the grain being processed, closure plates for the screened openings respectively, and means mounting each closure plate on the outside periphery of the metal shell and in a manner permitting adjustable movement with respect to its particular screened opening.

7. In a rotary malting drum, in combination, an outer cylindrical member and an inner cylindrical member in spaced concentric relation, said inner member having perforate cylindrical walls, imperforate end walls joining the said members to form a unitary drum, said outer cylindrical member essentially consisting of a metal shell having a plurality of screened openings therein to permit the escape of air but which prevent the passage of the grain being processed, closure plates for the screened openings respectively, and bracket means on the outside periphery of the metal shell for mounting each closure plate in a manner permitting adjustable movement with respect to its particular screened opening whereby each closure plate can be adjustably positioned to selectively control the escape of air from its screened opening.

8. In a rotary malting drum as defined by claim 7, wherein the screened openings each include a frame element fitted within an opening formed in the shell, and a perforated metal plate supported by each frame element.

9. In a rotary malting drum as defined by claim 7, wherein the screened openings are spaced longitudinally and circumferentially of the shell, and wherein each screened opening includes a frame element in associated relation with an opening formed in the shell, and a perforated metal plate supported by each frame element.

10. In a rotary malting drum, in combination, an outer cylindrical member and an inner cylindrical member, both members having perforate cylindrical walls and solid end walls, structural members in the form of beams located around the circumference of the inner member and angularly spaced to form openings extending longitudinally of the beams, closure plates adapted to be associated with certain of said longitudinally extending openings for controlling the closing and opening of the same, and means having connected relation with the plates for releasably locking the said plates in closed position.

11. In a rotary malting drum, in combination, an outer cylindrical member and an inner cylindrical member in substantially concentric relation with each other, both members having perforate cylindrical walls and solid end walls, whereby air admitted to the inner member will flow approximately radially from the inner member to escape from the outer member, structural members in the form of beams located around the circumference of the inner member and angularly spaced to form openings extending longitudinally of the beams, closure plates adapted to be associated with certain of said longitudinally extending openings for controlling the closing and opening of the same, means for each closure plate fixed to the cylindrical wall of the inner member and having a length to extend through an opening in its closure plate when the plate is positioned to close an opening between certain beams of the inner member, and spring clips adapted to be positioned between each fixed means and its plate for releasably retaining the plate in closed position.

12. In a rotary malting drum, in combination, an outer cylindrical member and an inner cylindrical member in substantially concentric relation with each other, said outer cylindrical member including solid end walls, a plurality of structural beams connecting the end walls and disposed in angular spaced relation around the circumference of the outer member, a perforated shell supported by the said structural beams and providing the cylindrical wall of the outer member, additional beams connecting the end walls and disposed in angular spaced relation around the circumference of the inner member, a perforated shell supported by the second mentioned beams exteriorly of the beams and providing the cylindrical wall of the inner member, closure plates adapted to be associated with certain pairs of the second mentioned beams for controlling the closing of the annular space between the beams, and means for releasably securing each of the closure plates in supported relation on the inside surface of its particular pair of beams to thus close the space between the beams, said means including resilient clips whereby the installation and removal of the plates is materially facilitated.

13. In a rotary malting drum, the combination with an outer cylindrical shell, of an inner cylindrical shell disposed concentric with respect thereto, the cylindrical walls of both said shells being perforate and said shells having solid end walls, whereby air admitted to the inner shell will flow into and through the annular space between the shells to escape from the outer shell, and a plurality of closure members in associated relation with the perforate cylindrical walls of at least one of said shells to form closure means therefor, said members being operable in an opening and closing direction, whereby the flow of air can be selectively controlled as to quantity, and whereby direction of said air flow from the inner shell to the outer shell can be substantially controlled.

14. In a rotary malting drum, the combination with an outer cylindrical shell, of an inner cylindrical shell disposed concentrically within the outer shell to provide an annular space for containing grain to be processed, the cylindrical walls of both said shells being perforate to permit the passage of air, a plurality of members positioned within the inner shell and disposed around the periphery thereof except for a gap opening where the members are omitted, and said members being operable to open and close the inner shell at the locations of the said members, whereby except for the gap openings the members control the quantity and direction of air flow from within the inner shell to the annular space and which may be selectively controlled by selectively opening or closing the said members.

15. In a rotary malting drum, the combination with an outer cylindrical member and an inner cylindrical member in substantially concentric relation with each other, both members having perforate cylindrical walls and solid end walls, whereby an annular space is provided for containing grain to be processed and whereby air admitted to the inner member will flow into and through the annular space to escape from the outer member, structural beams located within the inner member and spaced around the circumference of the inner member to form openings extending longitudinally of the beams, a plurality of closure plates supported by certain of said beams and disposed around the inner member except for a gap opening where the closure plates are omitted, and said closure plates being operable to open and close their respective opening between the beams, whereby except for the gap opening the closure plates control the quantity and direction of air flow from within the inner member to the annular space and which may be selectively controlled by selectively opening or closing the said plates.

References Cited in the file of this patent
UNITED STATES PATENTS

| | | |
|---|---|---|
| 667,229 | Knuttel | Feb. 5, 1901 |
| 1,750,813 | Oakley et al. | Mar. 18, 1930 |
| 2,947,669 | Graff et al. | Aug. 2, 1960 |